Dec. 20, 1960   H. S. GOLDSTONE   2,965,342
SUPPORT FOR VENT PIPE
Filed May 8, 1958   2 Sheets-Sheet 1
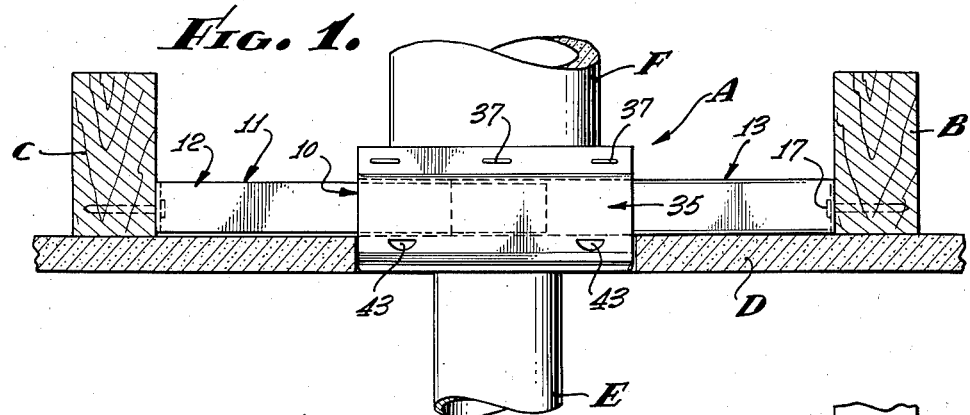
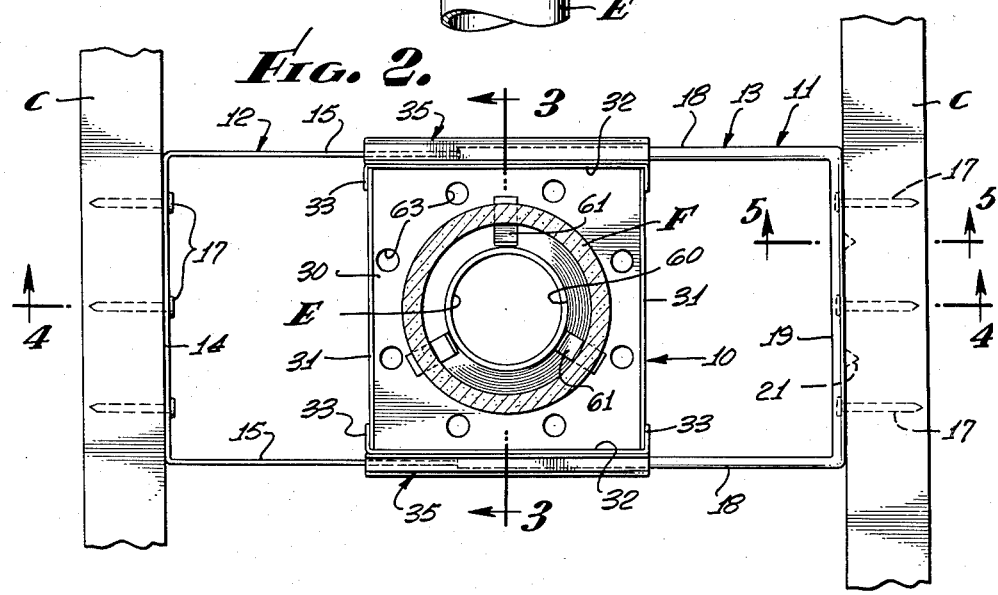
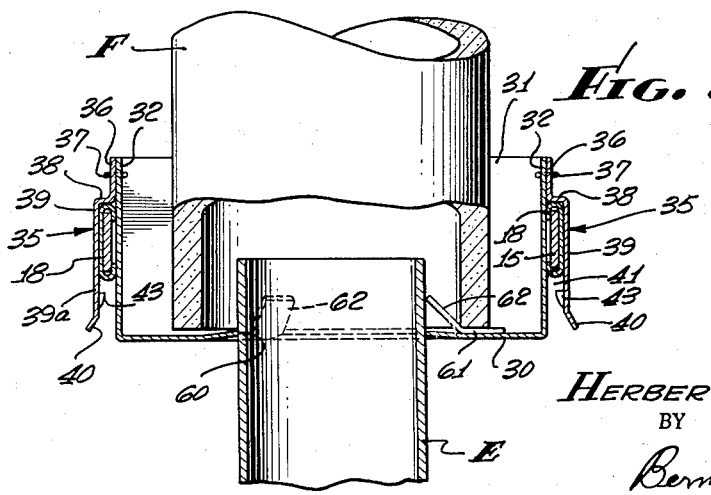
INVENTOR.
HERBERT S. GOLDSTONE
BY
Bernard Kriegel
ATTORNEY.

Dec. 20, 1960
H. S. GOLDSTONE
2,965,342
SUPPORT FOR VENT PIPE
Filed May 8, 1958
2 Sheets-Sheet 2
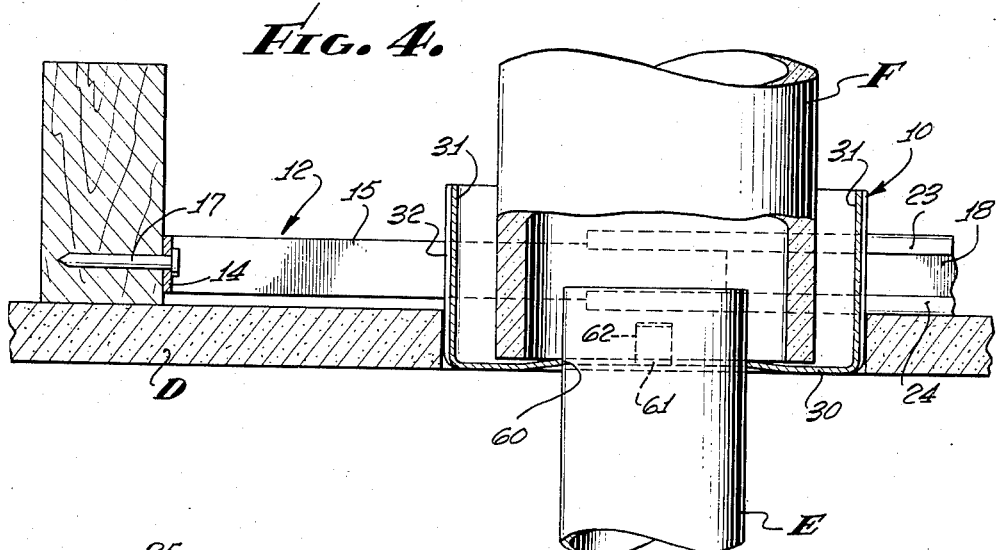
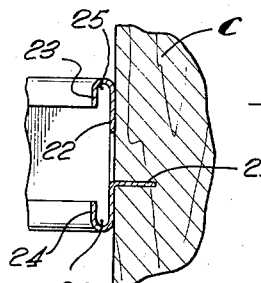
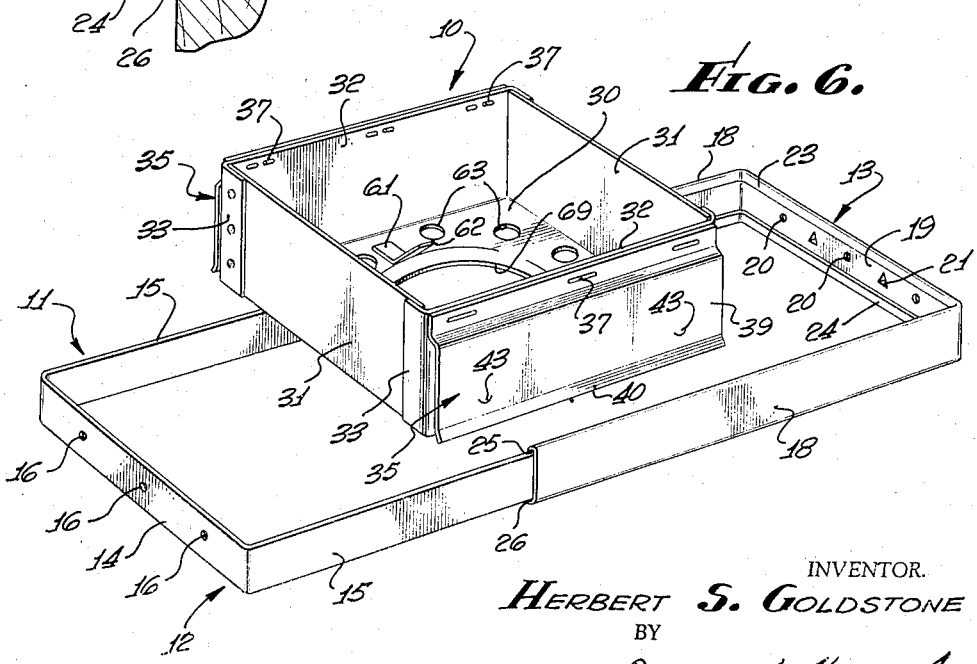
INVENTOR.
HERBERT S. GOLDSTONE
BY
Bernard Kriegel
ATTORNEY.

United States Patent Office 2,965,342
Patented Dec. 20, 1960

2,965,342

SUPPORT FOR VENT PIPE

Herbert S. Goldstone, Covina, Calif., assignor to Hyman Coutin, North Hollywood, Calif.

Filed May 8, 1958, Ser. No. 734,052

10 Claims. (Cl. 248—57)

The present invention relates to devices for appropriately supporting vent pipes through which flue gases and the like can escape to the atmosphere.

An object of the invention is to provide an improved vent pipe support capable of easy installation in a building.

Another object of the invention is to provide a vent pipe support capable of being secured to and between the joists of a building, which is readily adjustable to permit its installation between pairs of joists that may vary in distance from one another.

A further object of the invention is to provide a vent pipe support to be secured to the joists of a building, and including a vent pipe receiving bucket or holder that is easily shifted to a desired position between the joists after the support has been installed.

An additional object of the invention is to provide a vent pipe support including a vent pipe receiving bucket or holder resting upon a frame adapted to be secured to the joists of a building, in which the bracket or holder is easily mounted on the frame, but in which its inadvertent removal is prevented.

Yet another object of the invention is to provide a vent pipe support which is comparatively simple, economical to manufacture, and of strong and sturdy construction.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a side elevational view of a vent pipe support installed in a building;

Fig. 2 is a top plan view of the apparatus illustrated in Fig. 1;

Fig. 3 is an enlarged section taken along the line 3—3 on Fig. 2;

Fig. 4 is an enlarged fragmentary section taken along the line 4—4 on Fig. 2;

Fig. 5 is an enlarged fragmentary section taken along the line 5—5 on Fig. 2;

Fig. 6 is an exploded projection of the vent pipe bucket or holder and supporting frame.

The vent pipe support A illustrated in the drawings is adapted to be disposed between and secured to spaced joists B, C, such as the wooden ceiling joists of a building, to which a ceiling structure D may be suitably secured. A flue pipe E, that may be made of sheet metal, extends into the lower portion of the support A, which has the purpose of carrying or supporting a vent pipe F which normally extends in a known manner through the roof (not shown) of the building, such as a residential or commercial structure.

The vent pipe support A includes a bucket or holder 10 adapted to be mounted upon a frame 11. This frame includes opposed U-shaped members 12, 13 telescopically related to one another. Thus, one part 12 of the frame may include a central portion 14 adapted to bear against a side of a joist C, there being a pair of generally parallel inner bars, rods or arms 15, extending therefrom toward the other joist B. The central portion 14 has a plurality of holes 16 through which nails 17, or similar fastening elements, may be driven into the joist C, in order to firmly secure the central portion to the joists, usually with the frame member 11 disposed in a horizontal position. The inner arms 15 are telescopically disposed within the outer rods, bars, or arms 18 of the opposed U-shaped member 13, these outer arms being substantially parallel to one another and being integral with a central portion 19 that also has a plurality of holes 20 therethrough to receive nails 17, or the like, that are driven through the holes into the other joist B. As an aid to starting fastening of the telescopic frame structure 11 to the joist B, one of the central portions 19 may have a plurality of prongs 21 struck therefrom which can be forced or pressed into the side of the wood joist B.

The U-shaped member 12 may be made from flat strip stock bent to the proper U-shape. The other U-shaped member 13 is formed to provide an outer web portion 22 and upper and lower flanges 23, 24 extending toward each other and spaced from the web portion 22 to provide upper and lower guide grooves 25, 26 in which the inner arms 15 are slidable. The distance between the upper and lower portions of the arms or bars 18 is such as to be slightly greater than the width of an inner bar 15, so that the latter is freely slidable in the outer bar or arm. However, maximum play is avoided in order that the inner and outer arms 15, 18 will remain in substantial alignment with one another for various telescopic positions of the inner arms 15 within the outer arms 18. The lengths of the inner and outer arms 15, 18 are such that the inner arms 15 are still telescoped to a substantial distance within the outer arms 18 when the opposed central portions 14, 19 engage the sides of the joists C, B.

The bucket or holder portion 10 of the vent pipe support A may be of generally rectangular or square shape, including a bottom 30 from which opposed side walls 31 are bent in an upward direction to be substantially parallel with one another. Opposed end walls 32 are also bent upwardly from the bottom 30 and are substantially parallel to one another, there being flanges 33 extending inwardly from the end walls 32 around the exterior of the side walls 31 to complete the box-like structure of the bucket or holder 10. These flanges 33 are integrated to the side walls, as by spot welding.

The over-all distance across the end walls 32 is slightly less than the distance between the arms 18, 18 and 15, 15 to permit the bucket 10 to be disposed downwardly between such arms. When disposed downwardly between the arms, the bucket or holder 10 is supported from the latter by means of a pair of brackets 35 secured to the end walls. Thus, each bracket includes an upper flange 36 secured to the upper portion of an end wall 32 in any suitable manner, as by use of a plurality of staples 37. This flange merges into a web 38 bent substantially at right angles to the flange, which, in turn, merges into a depending skirt 39 extending downwardly substantially parallel to the end wall. The lower end 40 of the skirt is tapered or flared in a downward and outward direction, the skirt 39 being spaced from the end wall 32 by a distance that is slightly greater than the over-all thickness of the outer bar 18. For that matter, the width of the web 38 may be such that the upper end of the skirt 39 is spaced from the outer surface of an adjacent end wall 32 a distance slightly greater than the thickness of the outer bar 18. However, the skirt may be bent inwardly so that its lower portion 39a lies closer to the end wall than its upper end, requiring that the skirt be sprung outwardly to permit the bars 15, 18 to enter the guideway or groove 41 formed between the skirt 39 and an end wall 32. The bracket 35 preferably corresponds in length to that of an end wall 32, providing an elongate guideway or groove 41 to receive a telescopic inner and outer bar or arm assembly 15, 18.

One bracket 35 is attached to each end wall 32. They are oppositely arranged to form a pair of guideways or grooves 41 to receive the bars or arms 15, 18 on each side of the frame 11.

The bucket or holder 10 is adapted to be moved downwardly between the pairs of arms 15, 18, the skirts 39 being disposed on the outer sides of the arms 15, 18 and the end walls 32 on the inner sides of the arms, until the webs 38 of the brackets engage the upper portions of the bars or arms 15, 18. When this occurs, a plurality of holding prongs or tabs 43, which are struck inwardly from the lower portion of each skirt 39, may be disposed below the arms 15, 18, projecting to prevent upward movement of the bucket 10 and removal of the latter from the arms. The only feasible manner of removing the bucket from the arms is to spring the skirts 39 outwardly to a sufficient extent such that the holding prongs or tabs 43 clear the arms 15, 18. The tapered ends 40 on the skirts facilitate downward insertion of the bucket or holder 10 between and over the arms 15, 18 on opposite sides of the frame 11.

In the installation of the vent pipe support A in a building, the inner bars 15 are telescoped within the outer bars 18 of the frame 11. The central portion 19 is pressed against the sides of one of the joists B, while in a horizontal position, so as to force the prongs 21 into the joist B, which will hold the frame 11 in the appropriate horizontal position upon this joist. Nails 17 are then driven through the holes 20 of the central portion into the joist B, securing the U-shaped member 13 of generally channel cross-section to the joist. The other U-shaped member 12 is then moved outwardly until its central portion 14 engages the side of the opposed joist C and at the appropriate location thereon. Nails 17 are then driven through the holes 16 in the central portion 14 into the joist, thereby firmly securing the frame 11 between and to the joists B, C.

The bucket 10 is then moved downwardly, with its end walls 32 disposed between the pairs of telescopic arms or bars 15, 18. The flared ends 40 of the skirts 39 may engage the arms 15, 18 to deflect the lower portions of the skirts outwardly to an extent sufficient to permit the bars 15, 18 to shift relatively past the tabs 43 until the bucket 10 has been moved downwardly to the extent at which the bracket webs 38 rest upon the upper sides of the arms 15, 18. The skirt members 39 will then spring back inwardly toward the end walls 32 to dispose the holding prongs or tabs 43 under the arms 15, 18, precluding inadvertent upward removal of the bucket or holder 10 from the frame 11.

The bucket 10 can be shifted on the arms or bars 15, 18, which function as guide rails, to place it at the desired position between the joists B, C. The lower end of the vent pipe F can then be inserted into the bucket, resting upon its bottom 30 and being appropriately centered with respect to the central opening 60 in the bottom by circumferentially spaced centering tabs 61 secured to the bottom of the bucket and having an inner portion 62 projecting upwardly and inwardly. The flue pipe E extends upwardly through the central opening 60, with its upper portion piloted within the vent pipe F, in a known manner. The bottom 30 of the bucket or holder may have a plurality of holes 63 therethrough outwardly of the position of support of the vent pipe F to permit circulation of air around the pipe for the purpose of cooling the same. The flue pipe E may be made of sheet metal, whereas the vent pipe F may be made of any suitable heat resistant material.

It is, accordingly, evident that a vent pipe support has been provided, which can be made from sheet metal in a simple and economical manner. The frame 11 of the support A is easily mounted in a horizontal position between floor joists B, C and secured thereto, after which it is a simple matter to slip the bucket or holder 10 over the bars or arms 15, 18 of the frame 11 merely by springing the skirts 39 outwardly and then letting them spring inwardly once again, with the holding prongs or tabs 43 disposed underneath the arms. After the bucket 10 has thus been mounted on the arms, it can be slipped along the arms 15, 18 toward one joist or the other, in order to properly locate the bucket. The vent pipe F is supported by the bucket or holder 10, which, in turn, is firmly supported by the telescopic arms 15, 18. The fact that the frame 11 is telescopic in nature enables it to be secured properly and very easily to adjoining joists B, C, which may vary in distance from one another with respect to the distance between the joists. The distance between the central portions 14, 19 of the U-shaped members 12, 13 is easily variable merely by telescoping the inner bars 15 with respect to the outer bars 18. Thus, a single frame structure 11 can be elongated or shortened as the situation requires, to insure that the central portions 12, 13 are held flush against the joists B, C and are nailed securely thereto. The extent of telescoping overlapping of the inner bars 15 within the outer bars 18 is always sufficient to cause the bars to coact as a single rail structure after the frame 11 is installed between and secured to the joists, the bucket or holder 10 being appropriately supported by the bars 15, 18, the weight of the vent pipe F being insufficient to cause any substantial deflection of the bars.

The inventor claims:

1. In a vent pipe support: a frame adapted to be secured to spaced portions of a building, said frame including spaced members adapted to extend between the spaced building portions; a pipe supporting bucket having opposed, generally parallel end walls; brackets secured to said end walls and spaced therefrom in generally parallel relation thereto to provide guideways between said brackets and end walls to receive said spaced members with said brackets and bucket supported on said spaced members, the sides of each guideway being defined by an end wall and a bracket secured to said end wall.

2. In a vent pipe support: a frame adapted to be secured to spaced portions of a building, said frame including spaced members adapted to extend between the spaced building portions; a pipe supporting bucket having opposed, generally parallel end walls; brackets secured to said end walls and spaced therefrom in generally parallel relation thereto to provide guideways between said brackets and end walls open at their lower ends to permit entry of said spaced members into said guideways to a position in which said brackets rest upon said spaced members, the sides of each guideway being defined by an end wall and a bracket secured to said end wall.

3. In a vent pipe support: a frame adapted to be secured to spaced portions of a building, said frame including spaced members adapted to extend between the spaced building portions; a pipe supporting bucket having opposed, generally parallel end walls; brackets secured to said end walls and spaced therefrom in generally parallel relation thereto to provide guideways between said brackets and end walls open at their lower ends to permit entry of said spaced members into said guideways to a position in which said brackets rest upon said spaced members, the sides of each guideway being defined by an end wall and a bracket secured to said end wall; and releasable means on said brackets adapted to be disposed under said spaced members to prevent upward removal of said bucket and brackets from said spaced members, said releasable means being deflectable outwardly of said bucket to permit upward removal of said bucket and brackets from said spaced members.

4. In a vent pipe support: a frame including a pair of generally U-shaped members having central portions adapted to be secured to portions of a building and arms telescoped within one another; a pipe supporting bucket having means thereon providing guideways to receive said arms, said guideways being open at their lower ends, the horizontal width of each opening at said lower end and of each guideway being greater than the horizontal width of said arms to permit said bucket to be moved downwardly of said arms to dispose said arms in said guideways with said means resting upon said arms.

5. In a vent pipe support: a frame including a pair of generally U-shaped members having central portions adapted to be secured to portions of a building and arms telescoped within one another; a pipe supporting bucket; brackets secured to said bucket and spaced therefrom to provide guideways to receive said arms, said guideways being open at their lower ends, the horizontal width of each opening at said lower end and of each guideway being greater than the horizontal width of said arms to permit said bucket and brackets to be moved downwardly of said arms to dispose said arms in said guideways with said brackets resting upon said arms.

6. In a vent pipe support: a frame including a pair of generally U-shaped members having central portions adapted to be secured to portions of a building and arms telescoped within one another; a pipe supporting bucket having opposed end walls; brackets secured to said end walls and spaced therefrom to provide guideways open at their lower ends, the horizontal width of each opening at said lower end and of each guideway being greater than the horizontal width of said arms to permit entry of said arms into said guideways to a position in which said brackets rest upon said arms.

7. In a vent pipe support: a frame including a first U-shaped member having a central portion adapted to be secured to a building and generally parallel arms extending inwardly from said central portion, and a second U-shaped member having a central portion adapted to be secured to a building and generally parallel arms telescopically receiving said other arms; a pipe supporting bucket having means thereon providing guideways for receiving said arms, said guideways being open at their lower ends, the horizontal width of each opening at said lower end and of each guideway being greater than the horizontal width of said arms to permit said bucket to be moved downwardly of said arms to dispose said arms in said guideways with said means resting upon said arms.

8. In a vent pipe support: a frame including a first U-shaped member having a central portion adapted to be secured to a building and generally parallel arms extending inwardly from said central portion, and a second U-shaped member having a central portion adapted to be secured to a building and generally parallel arms telescopically receiving said other arms; a pipe supporting bucket; brackets secured to said bucket and spaced therefrom to provide guideways to receive said arms, said guideways being open at their lower ends, the horizontal width of each opening at said lower end and of each guideway being greater than the horizontal width of said arms to permit said bucket and brackets to be moved downwardly of said arms to dispose said arms in said guideways with said brackets resting upon said arms.

9. In a vent pipe support: a frame including a first U-shaped member having a central portion adapted to be secured to a building and generally parallel arms extending inwardly from said central portion, and a second U-shaped member having a central portion adapted to be secured to a building and generally parallel arms telescopically receiving said other arms; a pipe supporting bucket having opposed end walls; brackets secured to said end walls and spaced therefrom to provide guideways open at their lower ends, the horizontal width of each opening at said lower end and of each guideway being greater than the horizontal width of said arms to permit entry of said arms into said guideways to a position in which said brackets rest upon said arms.

10. In a vent pipe support: a frame including a first U-shaped member having a central portion adapted to be secured to a building and generally parallel arms extending inwardly from said central portion, and a second U-shaped member having a central portion adapted to be secured to a building and generally parallel arms telescopically receiving said other arms; a pipe supporting bucket having opposed end walls; brackets secured to said end walls and spaced therefrom to provide guideways open at their lower ends, the horizontal width of each opening at said lower end and of each guideway being greater than the horizontal width of said arms to permit entry of said arms into said guideways to a position in which said brackets rest upon said arms; and releasable means on said brackets adapted to be disposed under said arms to prevent upward removal of said bucket and brackets from said arms, said releasable means being deflectable outwardly of said bucket to permit upward removal of said bucket and brackets from said arms.

References Cited in the file of this patent

UNITED STATES PATENTS

| | | |
|---|---|---|
| 1,127,844 | Anderson | Feb. 9, 1915 |
| 1,586,244 | Hermann | May 25, 1926 |
| 2,788,188 | Smith | Apr. 9, 1957 |
| 2,816,726 | White | Dec. 17, 1957 |